United States Patent [19]

Goloff

[11] 4,072,088

[45] Feb. 7, 1978

[54] LIGHT-WEIGHT PISTON ASSEMBLIES

[75] Inventor: Alexander Goloff, East Peoria, Ill.

[73] Assignee: Caterpillar Tractor Co., Peoria, Ill.

[21] Appl. No.: 699,759

[22] Filed: June 25, 1976

[51] Int. Cl.[2] .................... F16J 1/00

[52] U.S. Cl. .................... 92/220; 92/221; 92/255; 277/189.5

[58] Field of Search .................... 92/216, 220, 219, 221, 92/172, 255; 277/189.5; 267/165, 1.5; 29/156.5

[56] References Cited

U.S. PATENT DOCUMENTS

| | | | |
|---|---|---|---|
| 1,464,612 | 8/1923 | Madler | 29/156.5 X |
| 1,865,793 | 7/1932 | Sawtelle | 92/230 X |
| 2,010,668 | 8/1935 | Hirshfeld | 267/165 X |
| 2,124,360 | 7/1938 | Welty | 277/189.5 X |
| 2,293,450 | 8/1942 | Wilkening | 267/1.5 |
| 2,349,919 | 5/1944 | Starr | 309/29 |
| 2,610,846 | 9/1952 | Hanna | 267/1.5 |
| 2,833,668 | 5/1958 | Dailey et al. | 277/189.5 X |
| 3,465,651 | 9/1969 | Tromel | 92/220 X |
| 3,794,311 | 2/1974 | Rode | 267/1.5 X |

FOREIGN PATENT DOCUMENTS

| | | | |
|---|---|---|---|
| 558,562 | 1/1944 | United Kingdom | 277/189.5 |

*Primary Examiner*—Irwin C. Cohen
*Attorney, Agent, or Firm*—Wegner, Stellman, McCord, Wiles & Wood

[57] ABSTRACT

A light weight piston assembly including a piston body formed of a light-weight metal and having a crown and a depending skirt, an annular recess about the end of the body adjacent the crown and opening toward the crown, the portion of the recess immediately adjacent the crown being threaded, a hard metal ring groove protection band having a peripheral, radially outwardly opening ring receiving groove disposed in the recess, at least one annular wavy spring in the recess, and a nut threaded on the threaded portion securing the band and the spring within the recess such that the spring is compressed to store energy to tightly hold the band against movement relative to the body during various piston operating conditions.

4 Claims, 3 Drawing Figures

LIGHT-WEIGHT PISTON ASSEMBLIES

BACKGROUND OF THE INVENTION

This invention relates to light-weight piston assemblies and, more specifically, to improved piston assemblies having piston bodies formed of light-weight metal and hard metal ring groove protection bands.

Prior art of possible relevance includes French Pat. No. 634,700 issued Nov. 30, 1927 to Ceskomoravska-Kolben Akciova Spolecnost and the following U.S. Letters Pat. Nos. 1,547,687 issued July 28, 1925 to Rohwer; 1,547,737 issued July 28, 1925 to Daiber; 2,266,192 issued Dec. 16, 1941 to Grieshaber; 2,340,919 issued May 30, 1944 to Starr; 2,361,095 issued Oct. 24, 1944 to Harrah; 2,398,577 issued Apr. 16, 1946 to Bratzel; 2,478,179 issued Aug. 9, 1949 to Brockmeyer; 2,759,461 issued Aug. 21, 1956 to Maybach et al; 2,807,247 issued Sept. 24, 1957 to Cramer; 3,215,130 issued Nov. 2, 1965 to Maier; 3,380,556 issued Apr. 30, 1968 to Whitehead; and 3,385,175 issued May 28, 1968 to Meier et al.

The advantages of light-weight piston assemblies in reciprocating mechanisms, particularly engines, have long been recognized. In general, such piston assemblies are formed principally of light-weight metal such as aluminum or aluminum alloys and are typically provided with a ring groove protection band formed of a hard metal, such as cast iron, which carries one or more compression rings. The use of such bands has been necessary to provide long life to the piston assemblies in that, as is well known, during operation of reciprocating mechanisms embodying such piston assemblies, the minute movement which the piston rings undergo during the operation of the reciprocating mechanism would cause rapid deterioration of ring-receiving grooves if the grooves were formed directly in the light-weight, and generally softer, piston body.

One approach to the manufacture of such composite piston assemblies is to cast the ring groove protection band in the piston body. This approach requires that the material of which the body is formed have a coefficient of thermal expansion very nearly equal to that of the material forming the band so that the band will not loosen within the body as operating temperatures of the reciprocating mechanism change during operation.

As a practical matter, this approach also requires that very sophisticated inspection techniques be employed to check the soundness of the metallurgical bond between the piston body and the band immediately after fabrication and before installation in a reciprocating mechanism to ensure that the bond will not fail and shorten the useful life of the mechanism.

A variety of other approaches have been used, as exemplified by the above cited prior art. For example, frequently, ring grooves are carried by portions of the piston crown which is formed of a hard metal and secured by any of a variety of means to a light-weight skirt. This approach tends to minimize the advantages accompanying light-weight piston assemblies in that, in lieu of a relatively small hard metal band, the entire crown is formed of a hard and relatively dense metal so that a heavier piston assembly results.

Moreover, when such an approach has been employed, generally relatively short threaded fasteners have been used to secure the crown to the piston skirt and such threaded fasteners are easily overstressed when tightened to the degree necessary to ensure that "creep" between the parts will not occur during operation. Such overstressing inevitably results in premature failure of the assembly.

The above-identified Starr patent employes still another approach employing a single elastic washer which is clamped against a band, the washer being intended to store a clamping energy to be directed against the band to hold the same in place. This approach has not met with a great deal of success since the washer is easily overstressed if it is sufficiently stiff and if not stiff, cannot store sufficient energy to maintain the parts in a solidly clamped configuration.

SUMMARY OF THE INVENTION

It is a principal object of the invention to provide a new and improved light-weight piston assembly. More specifically, it is an object of the invention to provide such a piston assembly which can be inexpensively manufactured and which is formed so that the components will not loosen during operation of a mechanism embodying the piston assembly.

An exemplary embodiment of the invention achieves the foregoing object in a light-weight piston assembly including a piston body formed of a light-weight metal and having a crown and a depending skirt. An annular recess is disposed about the end of the body adjacent the crown and opens toward the crown. The portion of the recess immediately adjacent the crown is threaded. A hard metal ring groove protection band having a peripheral, radially outwardly opening ring receiving groove disposed in the recess along with at least one annular wavy spring. A nut is threaded on the threaded portion securing the band and the spring within the recess such that the spring is compressed to store energy to tightly hold the band against movement relative to the body during various piston operating conditions.

In a preferred embodiment, a plurality of such annular springs are employed and the same are disposed between the band and the nut.

In one embodiment, a washer is interposed between the nut and the spring, and in a highly preferred embodiment, the materials of which the nut and the body are formed are selected so that they have substantially equal coefficients of thermal expansion.

In a highly preferred embodiment of the invention, the interior of the band is serrated. The band is also narrower at its radially outer extremity than at its radially inner extremity so that the force of the compressed springs will be principally applied at the radially inner extremity.

The invention also contemplates that the springs be defined by narrow metallic strips having their ends butt welded to form an annular structure.

Other objects and advantages will become apparent from the following specification taken in connection with the accompanying drawings.

DESCRIPTION OF THE PREFERRED EMBODIMENTS

Figure 1:
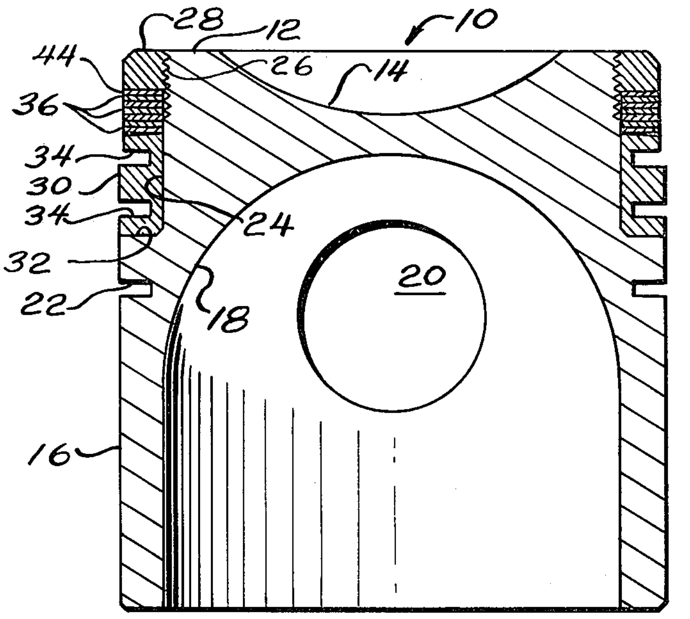
FIG. 1 is a sectional view of a piston assembly embodying the invention.

An exemplary embodiment of a piston assembly made according to the invention is illustrated in FIG. 1 and is seen to include a body, generally designated 10, formed of a light-weight material such as aluminum, magnesium or alloys thereof.

The body 10 is generally cylindrical in shape and has an upper crown 12 provided with a crater 14 to optimize combustion when the piston is employed in a reciprocating engine. The body 10 also has a depending skirt 16.

The assembly includes an interior, wrist pin and piston rod receiving cavity 18 and a transverse bore 20 for receipt of the wrist pin.

The body 10 is provided with a peripheral, radially outwardly opening groove 22 for recept of an oil ring and, immediately adjacent the crown, an annular recess 24 which opens radially outwardly and toward the crown. That portion of the surface of tghe recess 24 immediately adjacent the crown is threaded as illustrated at 26 for receipt of a nut 28. The nut 28 is formed of a material having a co-efficient of thermal expansion substantially identical to that of the material of which the body 10 is formed. In general, the nut 28 will be formed of the same material as that used in forming the body 10.

An annular, ring groove protection band 30 is disposed in the recess 24 in abutment with the lower edge 32 thereof. The band 30 is formed of a hard metal, such as cast iron, and is provided with one or more radially outwardly opening grooves 34 for receipt of compression rings.

Figure 2:
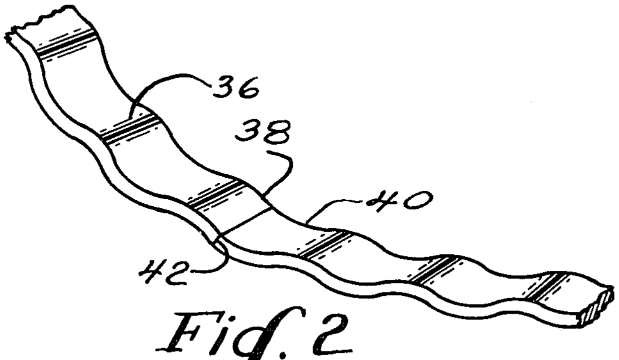
FIG. 2 is an enlarged, fragmentary view of one spring used in the assembly.

Intermediate the nut 28 and the band 30 is a plurality of annular, wavy springs 36 which are in a compressed state in the assembly. FIG. 2 illustrates a fragment of one of the springs 36 in an unstressed condition illustrating its wavy or sinusoidal condiguration. As will be seen hereinafter, the springs 36 may be formed of a narrow strip of steel having its ends 38 and 40 brought together and butt welded as at 42.

Interposed between the uppermost one of the springs 36 and the lower side of the nut 28 is a flat washer 44. Because the springs 36 are wavy, when compressed to a substantially flat condition by clamping action of nut 28, the stored clamping force in the springs will not be uniform about their peripheries. Rather, it will be greatest at the location of downwardly extending waves in the spring at least insofar as seen by the underlying structure. Accordingly, to equalize the contact stresses between the nut 28 and the crests of the springs 36, the washer 44 is interposed.

Figure 3:
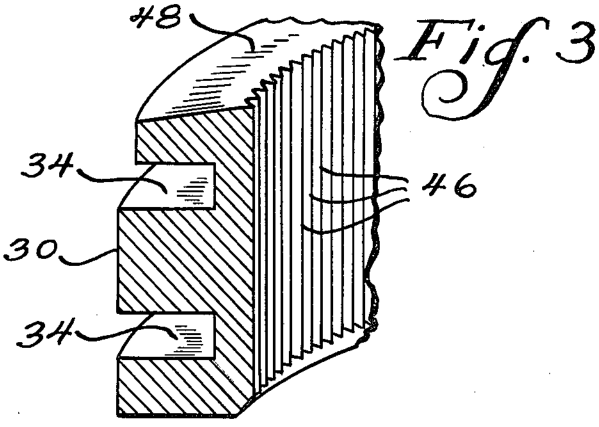
FIG. 3 is a fragmentary perspective view of a modified embodiment of a ring groove protection band that may be employed in the piston assembly.

FIG. 3 illustrates a modified embodiment of the invention. In the embodiment illustrated in FIG. 3, the inner diameter of the band 30 is serrated as illustrated at 46 to prevent the band 30 from turning on the body 10 when press fit thereon. The serrations run generally axially of the band 30. In addition, the upper surface 48 of the band 30 is frustoconical so that the band 30 is narrower at its outer diameter than at its inner diameter. As a consequence, the force applied to the band 30 from the springs 36 would be applied principally at the inner diameter where the band 30 is solid from top to bottom. This prevents any tendency of the springs 36 to cause partial collapse of the grooves 34 which could cause rings received therein to bind.

The piston assembly is formed in the following manner. The body 10 will be cast with the recess 24 therein. The threads 26 will be added and the band 30, the springs 36, the washer 44 and the nut 28 assembled thereon. At this time, the piston assembly may be finish machined and the grooves 22 and 34 formed in the body 10 and the band 30 respectively.

It is highly desirable that the grooves 34 not be formed prior to assembly of the components since the band 30 would then be in an unstressed state. Subsequent application of stress thereto by reason of the stored energy in the springs 36 could cause preformed grooves to distort, leading to poor sealing.

The economies resulting from the construction of the foregoing will be apparent from the following example. In a typical case, the band 30, with rings installed, may weight approximately 1.6 pounds and will require the application of 1000 pounds of a vertical force to hold it seated on the edge 32 against an acceleration of 600 times the force of gravity or 600 G's. This can be accomplished with eight of the washers 36, each provided with six waves 0.020 inches high and having a thickness of about 0.048 inches. Such washers would have a 5.4 inch outer diameter and a 4.6 inch inner diameter. The eight washers will have nodes which are virtually free of stress and it is therefore possible to manufacture them from strip steel having a yield strength above 50,00 p.s.i. at 550° F. The strip is coiled in a flat plane and the ends are butt welded as mentioned previously. The butt weld will be placed at any stress location where stresses are close to zero.

This cannot be done with washers such as described in the previously identified Starr patent, because there are no regions which stresses are zero throughout the cross section thereof. As a consequence, such structures have to be punched out of a wide strip having a width at least equal to the outer diameter of the washer with a resulting waste of material. Because of the low yield strength requirements of the springs, there is also a considerably greater number of steels suitable for the purpose and which could be used with washers, thereby providing a further economy.

What is claim is:

1. A light-weight piston assembly comprising:

a piston body formed of a light-weight metal and having a crown and a depending skirt;

an annular recess about the end of the body adjacent the crown and opening toward the crown, the portion of said recess immediately adjacent the crown being threaded;

a hard metal ring groove protection band having a peripheral, radially outwardly opening ring receiving groove disposed with a press fit in said recess;

at least one annular wavy spring in said recess; and a nut threaded on said threaded portion securing said band and said spring(s) within said recess such that said spring(s) is compressed to store energy to tightly hold said band against movement relative to said body during various piston operating conditions;

said spring(s) being defined by an elongated, narrow, metallic strip having its ends butt welded together to form an annular structure.

2. The piston assembly of claim 8 wherein said spring(s) is between said band and said nut.

3. A light-weight piston assembly comprising:

a piston body formed of a light-weight metal and having a crown and a depending skirt;

an annular recess about the end of the body adjacent the crown and opening toward the crown, the portion of said recess immediately adjacent the crown being threaded;

a hard metal ring groove protection band having a peripheral, radially outwardly opening ring receiving groove disposed in said recess;

at least one annular wavy spring in said recess; and a nut threaded on said threaded portion securing said band and said spring(s) with said recess such that said spring(s) is compressed to store energy to tightly hold said band against movement relative to said body during various piston operating conditions;

the interior of said band being axially serrated, said band being press fit on said body.

4. A light-weight piston assembly comprising:

a piston body formed of a light-weight metal and having a crown and a depending skirt;

an annular recess about the end of the body adjacent the crown and opening toward the crown, the portion of said recess immediately adjacent the crown being threaded;

a hard metal ring groove protection band having a peripheral, radially outwardly opening ring receiving groove disposed in said recess;

a nut formed of a light-weight metal and threaded on said threaded portion;

a flat washer abutting said nut on the side thereof adjacent said band; and a plurality of compressed annular springs interposed between said band and said washer, said springs being wavy when unstressed.

* * * * *

UNITED STATES PATENT AND TRADEMARK OFFICE
CERTIFICATE OF CORRECTION

PATENT NO. : 4,072,088

DATED : February 7, 1978

INVENTOR(S) : Alexander Goloff

It is certified that error appears in the above-identified patent and that said Letters Patent are hereby corrected as shown below:

Col. 1, line 14, change "2,340,919" to --2,349,919--;

Col. 3, line 18, change "recept" to --receipt--;
line 21, change "tghe" to --the--;
line 39, change "condiguration" to --configuration--

Col. 4, line 17, change "weight" to --weigh--;
line 27, change "50,00" to --50,000--;
line 34, change "which" to --where--;
line 64, change "8" to --1--.

Signed and Sealed this

*Twenty-seventh* Day of *June 1978*

[SEAL]

*Attest:*

RUTH C. MASON
*Attesting Officer*

DONALD W. BANNER
*Commissioner of Patents and Trademarks*